United States Patent
Porpora et al.

(10) Patent No.: US 10,102,220 B2
(45) Date of Patent: *Oct. 16, 2018

(54) ACTIVITY BASED ANALYTICS

(71) Applicant: International Business Machines Corporation, Armonk, NY (US)

(72) Inventors: Gregory A. Porpora, New Fairfield, CT (US); Janet L. Spann, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 161 days.

This patent is subject to a terminal disclaimer.

(21) Appl. No.: 15/185,503

(22) Filed: Jun. 17, 2016

(65) Prior Publication Data

US 2016/0292182 A1    Oct. 6, 2016

Related U.S. Application Data

(63) Continuation of application No. 14/039,718, filed on Sep. 27, 2013, now Pat. No. 9,396,253.

(51) Int. Cl.
*G06F 17/30* (2006.01)
*G06Q 50/26* (2012.01)

(52) U.S. Cl.
CPC .. *G06F 17/30241* (2013.01); *G06F 17/30516* (2013.01); *G06F 17/30598* (2013.01);
(Continued)

(58) Field of Classification Search
CPC .............. G06F 17/30705; G06F 17/30707
See application file for complete search history.

(56) References Cited

U.S. PATENT DOCUMENTS

| 9,396,253 B2 * | 7/2016 | Porpora | G06F 17/30699 |
| 2010/0076968 A1 * | 3/2010 | Boyns | H04W 4/21 707/732 |

(Continued)

OTHER PUBLICATIONS

Blasch et al.; Pattern Activity Clustering and Evaluation (PACE); Evolutionary and Bio-Inspired Computation: Theory and Applications VI; Proceedings of SPIE vol. 8402; May 2012; retrieved from the Internet on May 29, 2013; URL: http://proceedings.spiedigitallibrary.ord; 12 pages.

(Continued)

*Primary Examiner* — Mariela Reyes
*Assistant Examiner* — Courtney Harom
(74) *Attorney, Agent, or Firm* — Schmeiser, Olsen & Watts; John R. Pivnichny

(57) ABSTRACT

An approach for filtering data is presented. A first geo-hash indicating location information of a person based on profile data or a second geo-hash indicating location information of the person based on an inference is determined to have more characters and is selected as an optimal geo-hash specifying a first geospatial tag. Based on correlations between geospatial tags, time/date stamps, and contextual information, a relationship between first and second entity-metadata elements specifying the person and a vehicle, respectively, and between the person and the vehicle is determined. Representations of the first and second entity-metadata elements are displayed within a regular polygon that includes locations indicated by the geospatial tags. Based on hidden Markov and support vector machine models, a frequent pattern growth algorithm, and a Kohonen map, another activity of the person is predicted.

13 Claims, 9 Drawing Sheets

(52) U.S. Cl.
CPC .. *G06F 17/30699* (2013.01); *G06F 17/30705* (2013.01); *G06F 17/30864* (2013.01); *G06Q 50/26* (2013.01)

(56) References Cited

U.S. PATENT DOCUMENTS

| | | |
|---|---|---|
| 2011/0125678 A1 | 5/2011 | Partridge |
| 2011/0276396 A1* | 11/2011 | Rathod ............ G06F 17/30867 705/14.49 |
| 2012/0317198 A1 | 12/2012 | Patton et al. |
| 2013/0073336 A1 | 3/2013 | Heath |
| 2013/0073686 A1* | 3/2013 | Sandholm ........... G06F 17/3087 709/219 |
| 2015/0095333 A1 | 4/2015 | Porpora et al. |

OTHER PUBLICATIONS

Office Action (dated Aug. 26, 2015) for U.S. Appl. No. 14/039,718, filed Jul. 27, 2013.
Amendment filed Dec. 28, 2015 in response to Office Action (dated Aug. 26, 2015) for U.S. Appl. No. 14/039,718, filed Jul. 27, 2013.
Notice of Allowance (dated Apr. 19, 2016) for U.S. Appl. No. 14/039,718, filed Jul. 27, 2013.

* cited by examiner

ACTIVITY BASED ANALYTICS

This application is a continuation application claiming priority to Ser. No. 14/039,718 filed Sep. 27, 2013, now U.S. Pat. No. 9,396,253, issued Jul. 19, 2016.

TECHNICAL FIELD

The present invention relates to a data processing method and system for data analytics, and more particularly to a technique for filtering and correlating data to predict behavior of entities.

BACKGROUND

Known techniques in activity based intelligence analyze and process large volumes of data to perform change detection, which detects movement of a person or another entity. Known trend analysis and sentiment analysis techniques utilize key word searches to extract data from social media to detect and analyze trends and sentiments.

BRIEF SUMMARY

In a first embodiment, the present invention provides a method of filtering data into a geo-activity zone cell. The method includes a computer selecting an area of interest specifying an individual, organization, or entity. The method further includes the computer extracting data from streaming data and from data at rest. The method further includes the computer determining metadata of the extracted data. A first portion of the metadata includes one or more geospatial tags, one or more time and date stamps, and contextual information specifying the area of interest. A second portion of the metadata includes one or more other time and date stamps and other contextual information specifying the area of interest. The second portion of the metadata is missing one or more other geospatial tags specifying the area of interest. The method further includes the computer determining the one or more other geospatial tags missing from the second portion of metadata by (1) extracting a location of the individual, organization or entity from profile data specifying the individual, organization, or entity, or inferring the location of the individual, organization or entity based on a region-based geo-topic model of the individual, organization or entity; and (2) assigning the extracted location or the inferred location to the one or more other geospatial tags. The method further includes subsequent to the step of determining the one or more other geospatial tags, the computer filtering the extracted data into an entity-metadata element in a geo-activity zone cell based on the first and second portions of metadata and the one or more other geospatial tag(s) being within metadata boundaries of the an entity-metadata element.

In a second embodiment, the present invention provides a computer system comprising a central processing unit (CPU); a memory coupled to the CPU; and a computer-readable, tangible storage device coupled to the CPU. The storage device includes instructions that are executed by the CPU via the memory to implement a method of filtering data into a geo-activity zone cell. The method includes a computer system selecting an area of interest specifying an individual, organization, or entity. The method further includes the computer system extracting data from streaming data and from data at rest. The method further includes the computer system determining metadata of the extracted data. A first portion of the metadata includes one or more geospatial tags, one or more time and date stamps, and contextual information specifying the area of interest. A second portion of the metadata includes one or more other time and date stamps and other contextual information specifying the area of interest. The second portion of the metadata is missing one or more other geospatial tags specifying the area of interest. The method further includes the computer system determining the one or more other geospatial tags missing from the second portion of metadata by (1) extracting a location of the individual, organization or entity from profile data specifying the individual, organization, or entity, or inferring the location of the individual, organization or entity based on a region-based geo-topic model of the individual, organization or entity; and (2) assigning the extracted location or the inferred location to the one or more other geospatial tags. The method further includes subsequent to the step of determining the one or more other geospatial tags, the computer system filtering the extracted data into an entity-metadata element in a geo-activity zone cell based on the first and second portions of metadata and the one or more other geospatial tag(s) being within metadata boundaries of the entity-metadata element.

In a third embodiment, the present invention provides a computer program product including a computer-readable, tangible storage device and a computer-readable program code stored in the computer-readable, tangible storage device. The computer-readable program code includes instructions that are executed by a central processing unit (CPU) of a computer system to implement a method of filtering data into a geo-activity zone cell. The method includes a computer system selecting an area of interest specifying an individual, organization, or entity. The method further includes the computer system extracting data from streaming data and from data at rest. The method further includes the computer system determining metadata of the extracted data. A first portion of the metadata includes one or more geospatial tags, one or more time and date stamps, and contextual information specifying the area of interest. A second portion of the metadata includes one or more other time and date stamps and other contextual information specifying the area of interest. The second portion of the metadata is missing one or more other geospatial tags specifying the area of interest. The method further includes the computer system determining the one or more other geospatial tags missing from the second portion of metadata by (1) extracting a location of the individual, organization or entity from profile data specifying the individual, organization, or entity, or inferring the location of the individual, organization or entity based on a region-based geo-topic model of the individual, organization or entity; and (2) assigning the extracted location or the inferred location to the one or more other geospatial tags. The method further includes subsequent to the step of determining the one or more other geospatial tags, the computer system filtering the extracted data into an entity-metadata element in a geo-activity zone cell based on the first and second portions of metadata and the one or more other geospatial tag(s) being within metadata boundaries of the entity-metadata element.

Embodiments of the present invention employ metadata correlation analytics and geo-fenced multi-dimensional areas of interest, along with entity resolution, advanced analytics, and big data analysis to extract insight within a multi-dimensional feature space.

DETAILED DESCRIPTION

Overview

Embodiments of the present invention employ activity based analytics to analyze a large volume and a large variety of streaming data and data at rest to determine connections among data elements by utilizing metadata correlations relative to time, geographic space and context. Using geo-fenced areas of interest (i.e., geo-activity zone cells), embodiments of the present invention discover and track activities and transactions of entities in near real-time and predict activities and behavior of the entities. Each geo-fenced area of interest includes five dimensions: the three dimensions of space, along with time and context. Each area of interest may be expanded or shrunk on demand, as well as connected to one or more other areas of interest to discover inter-related effects among the connected areas of interest.

System for Filtering Data into a Geo-Activity Zone Cell

Figure 1:
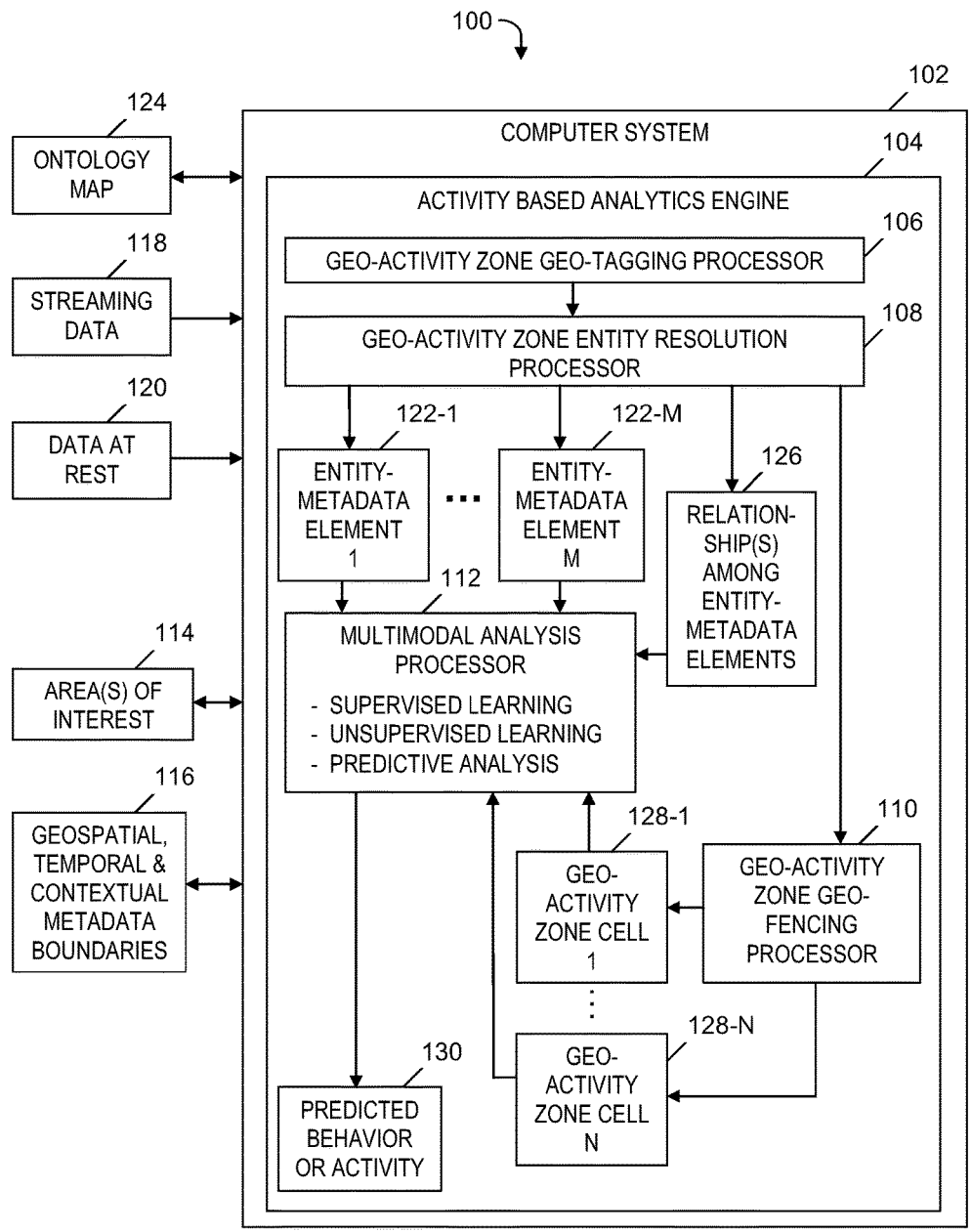
FIG. 1 is a block diagram of a system for filtering data into a geo-activity zone cell in accordance with embodiments of the present invention.

FIG. 1 is a block diagram of a system for filtering data into a geo-activity zone cell in accordance with embodiments of the present invention. A system 100 includes a computer system 102, which runs a software-based activity based analytics engine 104. Activity based analytics engine 104 includes the following software-based processing modules: a geo-activity zone geo-tagging processor 106, a geo-activity zone entity resolution processor 108, a geo-activity zone geo-fencing processor 110, and a multimodal analysis processor 112.

Activity based analytics engine 104 receives areas of interest 114 and receives or determines geospatial, temporal and contextual metadata boundaries 116. Furthermore, activity based analytics engine 104 extracts data from streaming data 118 and data at rest 120. As used herein, data at rest is infrequently changed data which is stored physically in digital form, which excludes data that frequently traverses a network or resides in temporary storage, and which includes, but is not limited to, data stored in databases, data warehouses, spreadsheets, data archives, backup storage tapes, off-site files and files on a storage area network.

Using the metadata boundaries 116 and the extracted data from streaming data 118 and data at rest 120, activity based analytics engine 104 defines entity-metadata elements 122-1 ... 122-M, where M≥1, and where entity-metadata elements 122-1 ... 122-M are specified for areas of interest 114 in a one-to-one correspondence.

Geo-activity zone geo-tagging processor 106 employs three methods to find or determine geo-tags and apply the geo-tags to data elements in the extracted data: (1) extracting latitude and longitude or other geographic coordinates that are embedded in the extracted data; (2) cross-referencing profiles to obtain registered location information about an individual, group, or other entity; and (3) making inferences about location information of an individual, group, or other entity based on region based geo-topic models that have been trained over time with training data which may be augmented by U.S. Geological Survey data and conversion tables. In one embodiment, geo-activity zone geo-tagging processor 106 applies the geo-tags to social media content extracted from streaming data 118. Geo-activity zone geo-tagging processor 106 also converts the applied geo-tags into geo-hashes (i.e., into the geohash format provided by the latitude/longitude geocode system invented by Gustavo Niemeyer).

Using the geo-tagged and non-geo-tagged data extracted from streaming data 118 and data at rest 120, and using an ontology map 124, geo-activity zone entity resolution processor 108 filters the extracted data by using entity resolution, relationship mapping and disambiguation to identify related data among the filtered data. Geo-activity zone entity resolution processor 108 places the identified related data into corresponding entity-metadata elements 122-1 ... 122-M using geospatial, temporal and contextual metadata boundaries 116. Furthermore, geo-activity zone entity resolution processor 108 determines relationship(s) 126 among entity-metadata elements 122-1 ... 122-M.

The context of the data being placed into the entity-metadata elements 122-1 ... 122-M based on the contextual boundaries includes, but is not limited to, key words, concepts, names, places, objects, events, activities, locations, times, and noun-verb pairs.

Ontology map 124 is a unique key word and concept ontology-topology map that is specific to one or more domains of knowledge. In one embodiment, ontology map 124 is specific to intelligence and law enforcement domains. For example, ontology map 124 may be based on a topology having entities, cognitive, dynamics and relationships categories. The entities category may include people, names, locations, organizations, weapons, technology, vehicles and key words, slang and acronyms. The cognitive category may include trends, concepts, sentiment and behavior. The dynamics category may include events, activities, situations and visual cues. The relationships category may include links, networks and biometrics.

Geo-activity zone geo-fencing processor 110 receives one or more latitude and longitude pairs specifying respective center points and furthermore receives respective one or more radii, where each radius may be, for example, a measurement of a distance from a center point in nautical miles. Based on the one or more center points and the respective one or more radii, geo-activity zone geo-fencing processor 110 generates and displays corresponding geo-activity zone cell 128-1 ... geo-activity zone cell 128-N, where N≥1. In one embodiment, geo-activity zone geofencing processor 110 generates each of geo-activity zone cell 128-1 . . . geo-activity zone cell 128-N as N data structures and displays the geo-activity zone cell(s) as respective regular polygon(s) specified by the respective center points and radii, where each regular polygon is centered at its center point and whose radius is the circumradius of the regular polygon. In one embodiment, each of geo-activity zone cells 128-1 . . . 128-N is represented as a five-dimensional fenced geo-referenced polygon having the three dimensions of space, one dimension of time and one dimension of context.

Geo-activity zone cells 128-1 . . . 128-N may be predefined based on historical data or geo-activity zone geofencing processor 110 may specify each geo-activity zone cell by a corresponding area of interest that is discovered based on analysis of real-time events and streaming data 118.

Geo-activity zone geo-fencing processor 110 displays a representation of entity-metadata element 122-1 . . . entity-metadata 122-M as being included in geo-activity zone cell 128-1 (or another geo-activity zone cell) based on geospatial data included in entity-metadata element 122-1 . . . entity-metadata element 122-M.

Geo-activity zone cells 128-1 . . . 128-N are configured so that activity based analytics engine 104 processes only data in entity-metadata element 122-1 . . . 122-M whose context is within each of the contextual boundaries of geo-activity zone cells 128-1 . . . 128-N. Activity based analytics engine 104 generates an alert in response to identifying a convergence of interest between entity-metadata elements 122-1 . . . 122-M or between areas of interest represented by geo-activity zone cells 128-1 . . . 128-N.

Alternately, activity based analytics engine 104 may employ clustering, compute a respective centroid, and calculate boundaries of a geo-activity zone cell to generate a new geo-activity zone cell included in geo-activity zone cell 128-1 . . . 128-N.

Activity based analytics engine 104 moves a representation of geo-activity zone cells 128-1 . . . 128-N over time, and may shrink or expand each geo-activity zone cell based on a selection of respective geo-hash coordinate resolution. Activity based analytics engine 104 may interconnect two or more of the geo-activity zone cells 128-1 . . . 128-N to determine whether or not there are relationships among the interconnected geo-activity zone cells.

Multimodal analysis processor 112 receives the data in the entity-metadata elements 122-1 . . . 122-M that are included in geo-activity zone cells 128-1 . . . 128-N, and subsequently uses the data as input to pre-trained supervised machine learning methods, unsupervised machine learning methods, and predictive analysis to model and generate a predicted behavior or activity 130 of a person, group or other entity specified by areas of interest 114, or to discover patterns of life, determine a complex event process, track an activity, or detect an anomaly within areas of interest 114.

The functionality of the components of FIG. 1 is described in more detail in the discussion presented below relative to FIGS. 2A-2B, FIG. 3, FIG. 5, FIG. 6 and FIG. 7 and in the section presented below entitled Computer System.

Process for Filtering Data into a Geo-Activity Zone Cell

Figure 2A:
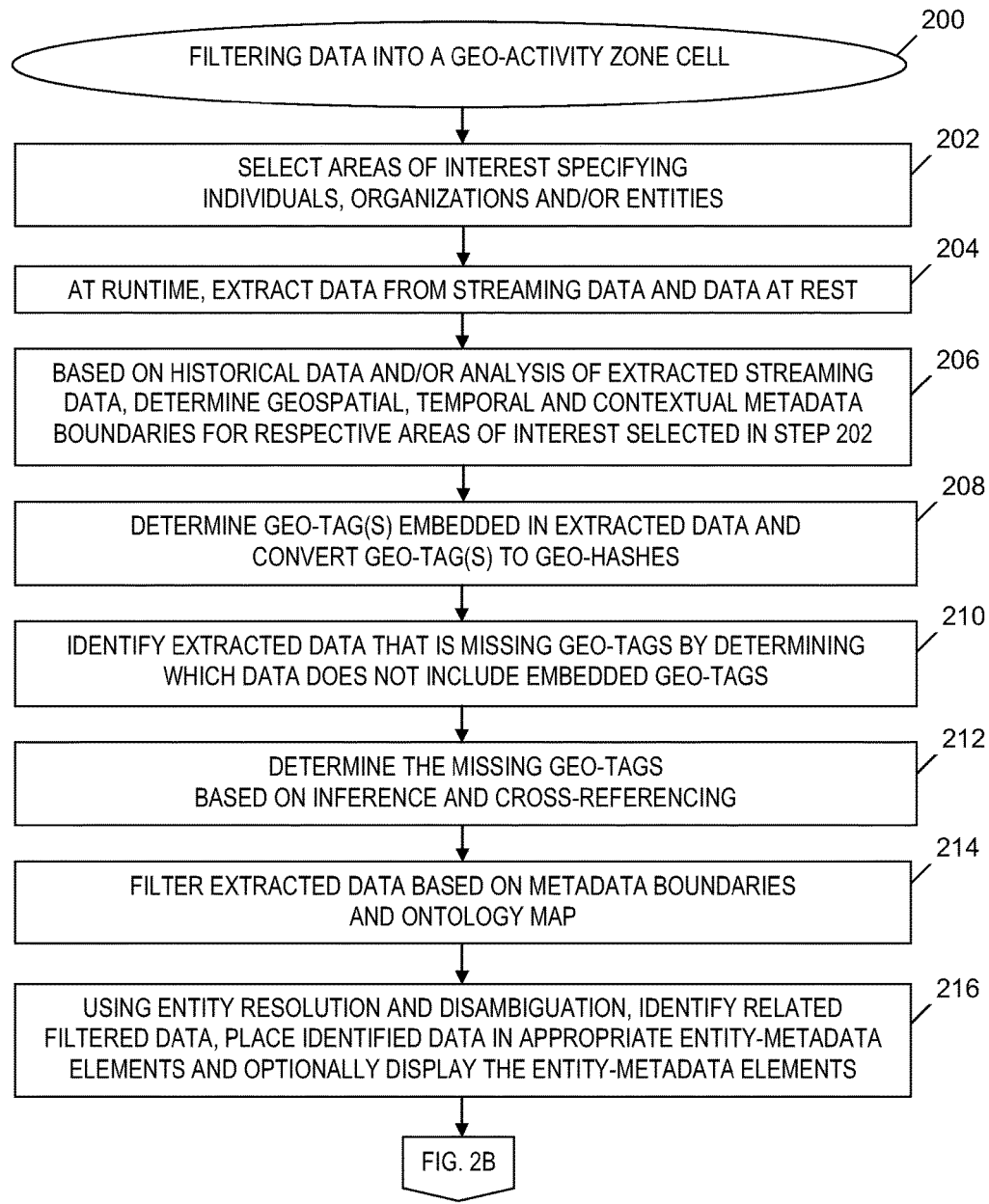
FIGS. 2A-2B depict a flowchart of a process of filtering data into a geo-activity zone cell in the system of FIG. 1, in accordance with embodiments of the present invention.
Figure 2B:
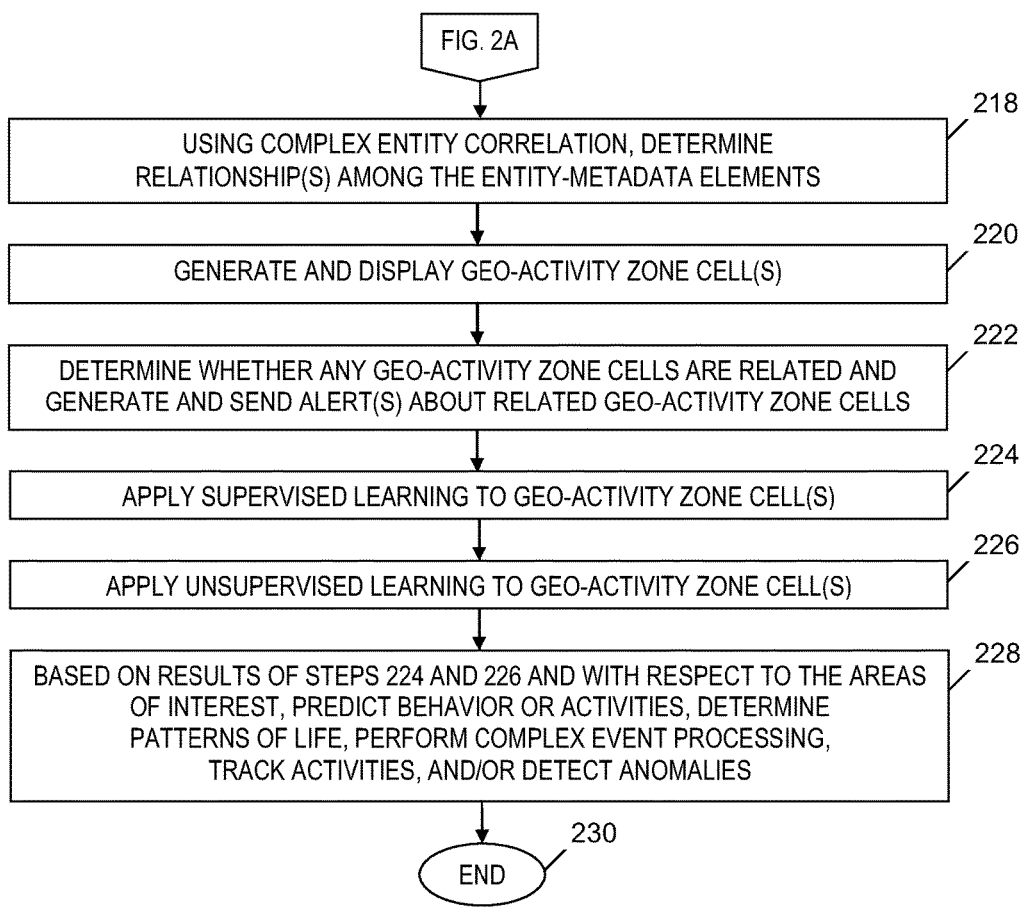

FIGS. 2A-2B depict a flowchart of a process of filtering data into a geo-activity zone cell in the system of FIG. 1, in accordance with embodiments of the present invention. The process of filtering data into a geo-activity zone cell starts at step 200. In step 202, activity based analytics engine 104 (see FIG. 1) receives or selects one or more areas of interest 114 (see FIG. 1), where each area of interest specifies an individual, a group (i.e., a network of persons), an organization, a vehicle, or another entity.

In step 204, at runtime, activity based analytics engine 104 (see FIG. 1) extracts data from streaming data 118 (see FIG. 1) and from data at rest 120 (see FIG. 1). Streaming data 118 (see FIG. 1) and data at rest 120 (see FIG. 1) provide multiple types of feature space sources, including, but not limited to, social media, e-mails, imagery, video, audio, reports and documents.

In step 206, based on historical data and/or an analysis of data extracted from streaming data 118 (see FIG. 1) in step 204, activity based analytics engine 104 (see FIG. 1) determines geospatial, temporal and contextual metadata boundaries 116 (see FIG. 1), where the boundaries define one or more entity-metadata elements 122-1 . . . 122-M (see FIG. 1) for respective one or more areas of interest 114 (see FIG. 1) selected in step 202.

In an alternate embodiment, in step 206, activity based analytics engine 104 (see FIG. 1) does not determine the aforementioned boundaries of metadata, but rather receives user-defined boundaries of geospatial, temporal and contextual metadata, where the user-defined boundaries define one or more geo-activity zone cells for respective area(s) of interest 114 (see FIG. 1) selected in step 202.

In step 208, geo-activity zone geo-tagging processor 106 (see FIG. 1) (1) determines geo-tag(s) associated with one or more data elements in the data extracted in step 204 by identifying latitude and longitude or other geographic coordinates embedded in the extracted data, where the identified coordinates are designated as the geo-tag(s) and (2) converting the geo-tag(s) to geo-hash(es). As one example, geo-activity zone geo-tagging processor 106 (see FIG. 1) identifies latitude and longitude pairs in the base metadata payload of 5% or less of the data extracted in step 204, while determining that the other data extracted in step 204 is time stamped, but does not include latitude and longitude metadata.

In step 210, geo-activity zone geo-tagging processor 106 (see FIG. 1) identifies extracted data that is missing geo-tags by determining one or more other data elements that are included in the data extracted in step 204 and in which geographic coordinates are not embedded.

In step 212, for the other data element(s) determined in step 210, geo-activity zone geo-tagging processor 106 (see FIG. 1) determines the missing geo-tag(s) based on inference and/or cross-referencing. One embodiment of step 212 is described in more detail below with reference to FIG. 3.

In step 214, based on metadata boundaries 116 (see FIG. 1) determined or received in step 206 and based on ontology map 124 (see FIG. 1), activity based analytics engine 104 (see FIG. 1) filters the data extracted in step 204, so that a proper subset of the extracted data that is specified by the metadata boundaries 116 (see FIG. 1) results from the filtering and is available for further processing by subsequent steps in FIGS. 2A-2B. In one embodiment, geo-activity zone entity resolution processor 108 (see FIG. 1) performs the filtering of the extracted data in step 214.

In step 216, by a utilization of entity resolution and disambiguation, geo-activity zone entity resolution processor 108 (see FIG. 1) identifies data elements included in the data filtered in step 214 that are interrelated, places the identified, interrelated data elements in respective entity-metadata elements 122-1 . . . 122-M (see FIG. 1) based on metadata boundaries 116 (see FIG. 1) determined or received in step 206, and may initiate a display of entity-metadata elements 122-1 . . . 122-M (see FIG. 1). In one embodiment, step 216 is performed repeatedly during runtime to update entity-metadata elements 122-1 . . . 122-M (see FIG. 1) by placing additional filtered data extracted from streaming data 118 (see FIG. 1) into appropriate entity-metadata elements 122-1 . . . 122-M (see FIG. 1) and display the updated entity-metadata elements 122-1 . . . 122-M (see FIG. 1). After step 216, the process of FIGS. 2A-2B continues in FIG. 2B.

In step 218 in FIG. 2B, by a utilization of complex entity correlation, geo-activity zone entity resolution processor 108 (see FIG. 1) determines relationship(s) 126 (see FIG. 1) among entity-metadata elements 122-1 . . . 122-M (see FIG. 1). The complex entity correlation is based on a determination of correlations between temporal metadata, between geospatial metadata (i.e., geo-tags embedded in the extracted data and the geo-tags determined by inference and cross-referencing), and between contextual metadata included in entity-metadata elements 122-1 . . . 122-M (see FIG. 1). In one embodiment, step 218 is performed repeatedly at runtime to determine additional relationships or change previously determined relationships among entity-metadata elements 122-1 . . . 122-M (see FIG. 1) based on additional data extracted from streaming data 118 (see FIG. 1). In an alternate embodiment, step 218 is omitted from the process of FIGS. 2A-2B.

In step 220, geo-activity zone geo-fencing processor 110 (see FIG. 1) receives one or more latitude and longitude pairs or another form of geographic coordinates specifying center point(s), and receives one or more radii (e.g., each radius being a circumradius of a regular polygon) or one or more other distance measurements. The latitude and longitude pairs and the radii are selected by an analyst. In one embodiment each radius is provided in nautical miles.

Also in step 220, geo-activity zone geo-fencing processor 110 (see FIG. 1) generates a continuous query against geo-referenced data resulting from step 208 (see FIG. 2A) and step 212 (see FIG. 2A), where the query searches the geo-referenced data based on the latitude and longitude pairs and the radii. The query employs a location-time-threshold search that uses a master key that cross correlates and disambiguates all geo-referenced metadata resulting from step 208 (see FIG. 2A) and step 212 (see FIG. 2A) into the four groups of metadata: (1) persons of interest centric; (2) network centric; (3) entity centric; and (4) general geo-fenced, which are described below relative to FIG. 5.

Furthermore, in step 220, geo-activity zone geo-fencing processor 110 (see FIG. 1) generates and initiates a display of geo-activity zone cells 128-1 . . . 128-N (see FIG. 1) based on respective center points and radii received in step 220. In one embodiment, each geo-activity zone cell generated in step 220 is represented as a regular polygon centered at the respective center point and having a circumradius equal to the respective radius. In one embodiment, step 220 includes the process of FIG. 5, which is described below.

In one embodiment, activity based analytics engine 104 (see FIG. 1) dynamically updates geo-activity zone cells 128-1 . . . 128-N (see FIG. 1) at runtime as additional data is extracted from the variety of sources that provide streaming data 118 (see FIG. 1).

In step 222, if N≥2, geo-activity zone geo-fencing processor 110 (see FIG. 1) connects two or more geo-activity zone cells 128-1 . . . 128-N (see FIG. 1) to each other to determine whether a relationship exists between the connected geo-activity zone cells. If a relationship is determined to exist between the connected geo-activity zone cells, then geo-activity zone geo-fencing processor 110 (see FIG. 1) generates and sends an alert about the relationship between the geo-activity zone cells. In one embodiment, step 222 is performed repeatedly at runtime to determine additional relationships or change previously determined relationships among geo-activity zone cells 128-1 . . . 128-N (see FIG. 1) based on additional data extracted from streaming data 118 (see FIG. 1). If N=1 or in an alternate embodiment, step 222 is omitted from the process of FIGS. 2A-2B.

In step 224, multimodal analysis processor 112 (see FIG. 1) applies supervised learning techniques to geo-activity zone cells 128-1 . . . 128-N (see FIG. 1). The supervised learning techniques include an application of machine learning rules and trained machine learning models, which may include association, classification, regression analysis and time series analysis models. In one embodiment, step 224 includes the process of FIG. 6, which is described below.

In step 226, multimodal analysis processor 112 (see FIG. 1) applies unsupervised learning techniques to geo-activity zone cells 128-1 . . . 128-N (see FIG. 1). The unsupervised learning techniques are continuously applied in step 226 across selected areas of interest to determine relationships among metadata and among areas of interest, where the relationships were previously unknown. In one embodiment, step 226 includes the process of FIG. 7, which is described below.

In step 228, based on the results of steps 224 and 226, and with respect to the area(s) of interest 114 (see FIG. 1) selected in step 202 (see FIG. 2A) and the one or more individuals, groups, and/or other entities specified by the area(s) of interest 114 (see FIG. 1), multimodal analysis processor 112 (see FIG. 1) performs predictive analysis to predict behavior or activities, determine patterns of life, perform complex event processing, track activities, and/or detect anomalies. The predicted behavior or activities resulting from step 228 includes predicted behavior or activity 130 (see FIG. 1). In one embodiment, steps 224, 226 and 228 are performed repeatedly at runtime to update the results of the supervised and unsupervised learning techniques based on additional data extracted from streaming data 118 (see FIG. 1) and to predict additional behavior or activities of the individual(s), group(s) or the one or more other entities based on the updated results of the supervised and unsupervised learning techniques.

Following step 228, the process of FIGS. 2A-2B ends at step 230.

Process for Determining Missing Geo-Tags

Figure 3:
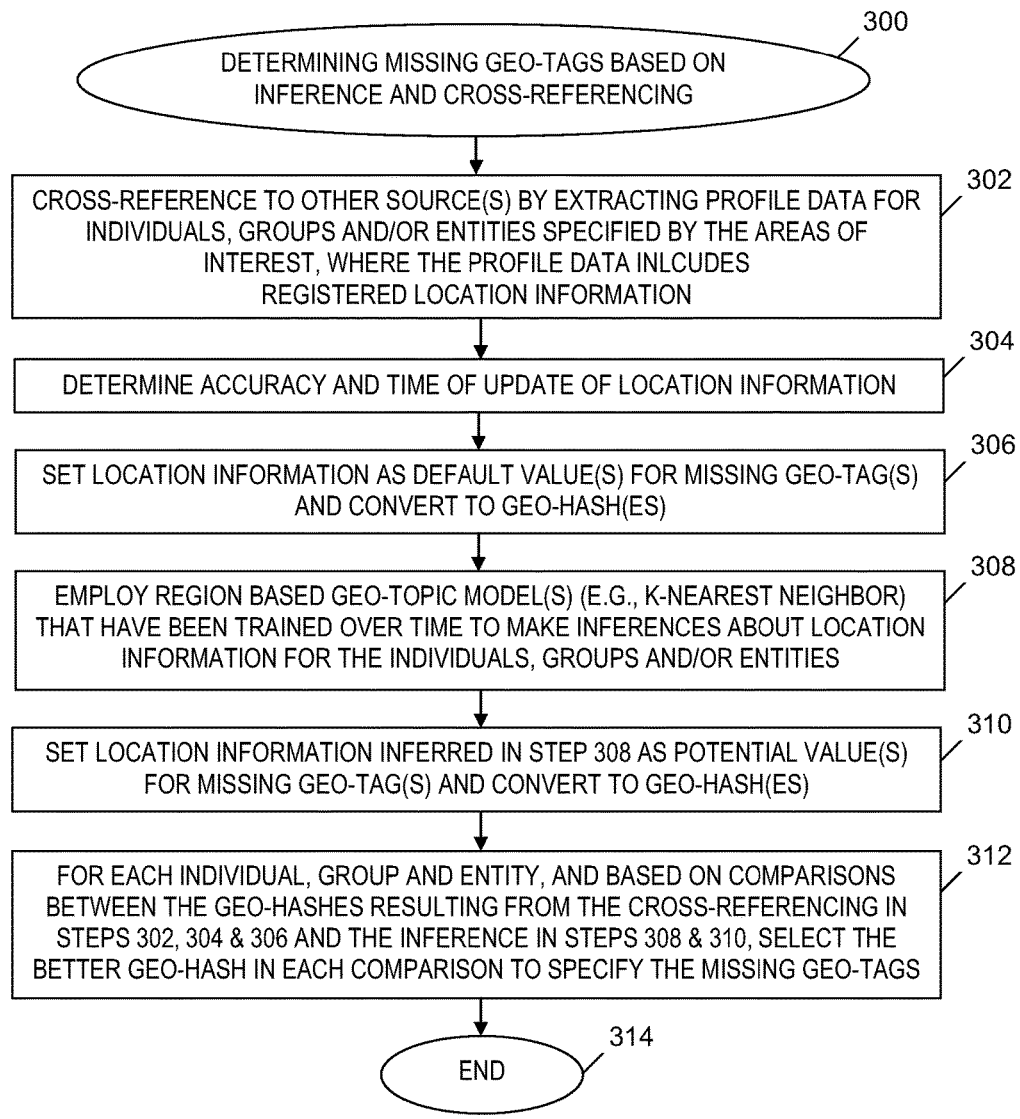
FIG. 3 depicts a flowchart of a process of determining missing geo-tags based on inference and cross-referencing, where the process is included in the process of FIGS. 2A-2B, in accordance with embodiments of the present invention.

FIG. 3 depicts a flowchart of a process of determining missing geo-tags based on inference and cross-referencing, where the process is included in the process of FIGS. 2A-2B, in accordance with embodiments of the present invention. In one embodiment, the process of FIG. 3 is included in step 212 (see FIG. 2A). The process of determining missing geo-tags based on inference and cross-referencing starts at step 300, where the missing geo-tag(s) are determined in step 212 (see FIG. 2A).

In step 302, geo-activity zone geo-tagging processor 106 (see FIG. 1) performs a cross-reference to other data source (s) by extracting one or more sets of profile data describing the one or more entities specified by the area(s) of interest 114 (see FIG. 1) selected in step 202 (see FIG. 2A). The extracted profile data includes registered location information that provides geographic location(s) of the one or more entities, where the geographic location(s) and the one or more entities are associated in a one-to-one correspondence. The profile data may be extracted from social media or other sources.

In one embodiment, step 302 is repeated during the process of FIG. 3 in order to extract newly generated profile data and updated profile data.

In step 304, geo-activity zone geo-tagging processor 106 (see FIG. 1) determines the accuracy and a time of an update of the location information included in the profile data extracted in step 302.

In step 306, geo-activity zone geo-tagging processor 106 (see FIG. 1) sets the location information as default value(s) for the missing geo-tag(s), and converts the default value(s) to respective geo-hash(es).

In step 308, geo-activity zone geo-tagging processor 106 (see FIG. 1) employs one or more region based geo-topic models using a k-nearest neighbor distance calculator, where the models have been trained over time to infer location information, which provides the geographic location(s) of the one or more entities specified by area(s) of interest 114 (see FIG. 1) selected in step 202 (see FIG. 2A). In one embodiment, a geo-topic model includes multiple regions, where each region is specified by a geo-topic that includes a location name that may be complete or partial, an address that is complete or partial, events, and annotated images.

In step 310, geo-activity zone geo-tagging processor 106 (see FIG. 1) sets the location information inferred in step 308 as potential value(s) for the missing geo-tag(s), and converts the potential value(s) to respective geo-hash(es).

In step 312, for each entity specified by an area of interest selected in step 202 (see FIG. 2A), and based on comparisons between each of the geo-hashes resulting from the cross-referencing in steps 302, 304 and 306 and other corresponding geo-hashes resulting from the inference in steps 308 and 310, geo-activity zone geo-tagging processor 106 (see FIG. 1) determines and selects the best or optimal geo-hash for each comparison to specify the corresponding missing geo-tags. The best or optimal geo-hash is determined in step 312 based on predetermined criteria such as the precision of the geo-hash. In one embodiment, geo-activity zone geo-tagging processor 106 (see FIG. 1) determines a first geo-hash is better than a second geo-hash based on geo-tagging processor 106 (see FIG. 1) determining the first geo-hash is longer (i.e., has more characters) than the second geo-hash.

Following step 312, the process of FIG. 3 ends at step 314.

Figure 4:
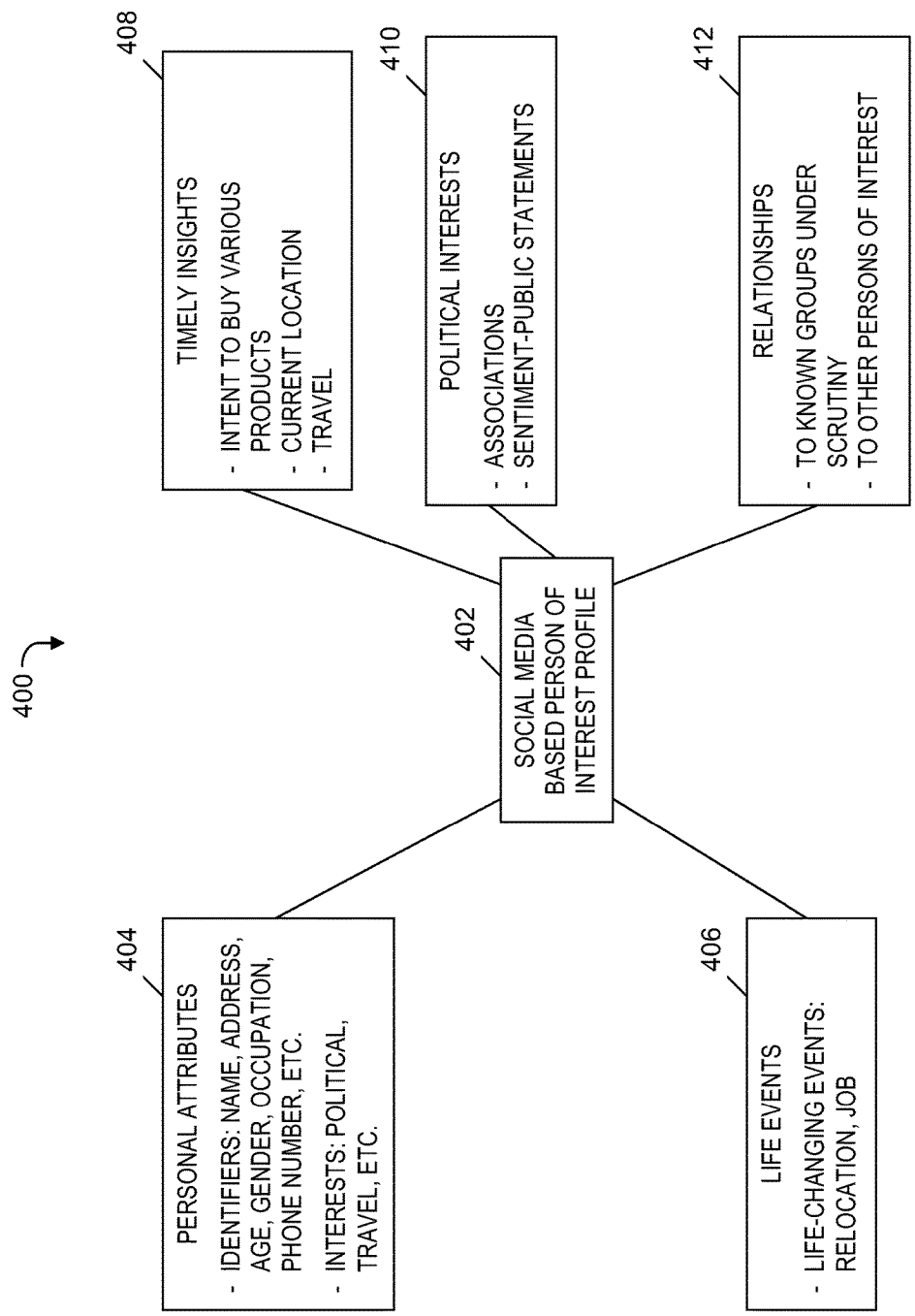
FIG. 4 is an example of profile data that includes a person of interest profile employed by the cross-referencing in the process of FIG. 3, in accordance with embodiments of the present invention.

FIG. 4 is an example of profile data that includes a person of interest profile employed by the cross-referencing in the process of FIG. 3, in accordance with embodiments of the present invention. As one example, profile data 400 is extracted in step 302 (see FIG. 3). Profile data 400 includes a person of interest profile 402 that describes an individual (i.e., a person of interest) and that includes data retrieved or derived from the individual's use of social media. The data in person of interest profile 402 may be extracted in step 302 (see FIG. 3). Person of interest profile 402 includes personal attributes 404, life events 406, timely insights 408, political interests 410, and relationships 412.

Personal attributes 404 includes attributes of the individual, including identifiers of the person's name, address, age, gender, occupation, phone number, etc. Personal attributes 404 also includes interests of the individual. Life events 406 include life-changing events experienced by the individual.

Timely insights 408 include the individual's intention to buy various products or to travel. Timely insights 408 also include location information about the individual, such as the individual's current location. The current location in timely insights 408 may be the location information that is set as a default value for a missing geo-tag in step 306 (see FIG. 3).

Political interests 410 include associations to which the individual belongs. Political interests 410 also include public statements made by the individual, where the statements express sentiments of the individual. Relationships 412 include relationships that the individual has to other persons of interest and to groups that are under scrutiny.

Process for Generating and Displaying Geo-Fenced Area

Figure 5:
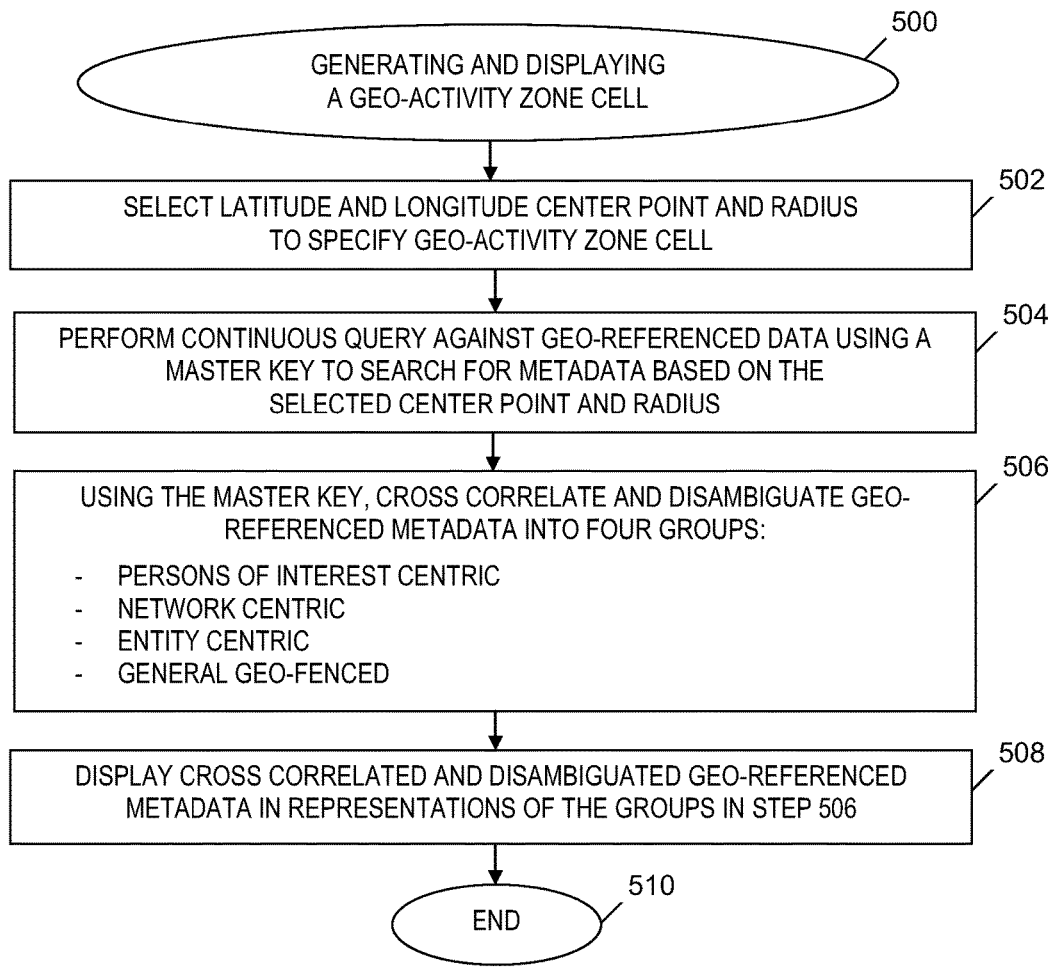
FIG. 5 depicts a flowchart of a process of generating and displaying a geo-activity zone cell, where the process is included in the process of FIGS. 2A-2B, in accordance with embodiments of the present invention.

FIG. 5 depicts a flowchart of a process of generating and displaying a geo-activity zone cell, wherein the process is included in the process of FIGS. 2A-2B, in accordance with embodiments of the present invention. In one embodiment, the process of FIG. 5 is included in step 220 (see FIG. 2B). The process of generating and displaying a geo-activity zone cell (e.g., geo-fenced polygon) included in geo-activity zone cell(s) 128-1 . . . 128-N (see FIG. 1) begins at step 500. In step 502, geo-activity zone geo-fencing processor 110 (see FIG. 1) selects or receives (1) a latitude and longitude (or another form of geographic coordinates) of a center point and (2) a radius or distance from the center point to specify the geo-activity zone cell included in geo-activity zone cell(s) 128-1 . . . 128-N. In one embodiment, the geo-activity zone cell specified by the latitude and longitude pair and the radius is a geo-fenced regular polygon, where the radius is the circumradius of the regular polygon.

In step 504, geo-activity zone geo-fencing processor 110 (see FIG. 1) starts a continuous query against geo-referenced metadata using a master key to search for metadata in entity-metadata elements 122-1 . . . 122-M (see FIG. 1) based on the center point and the radius or distance selected or received in step 502.

In step 506, using the master key, geo-activity zone geo-fencing processor 110 (see FIG. 1) cross correlates and disambiguates the geo-referenced metadata into four groups which are: (1) persons of interest centric; (2) network centric; (3) entity centric; and (4) general geo-fenced. The persons of interest centric group of metadata may include person identifiers, trends, activities, sentiment, events and images associated with persons. Each person is a single target operating with an area of interest. The network centric group of metadata may include network identifiers, sentiment, activities, events, images and trends associated with networks. As used herein, a network is defined as a group of people who are communicating. People in a network may have both direct and non-obvious relationships with each other. The entity centric group of metadata may include entity identifiers, activities, events and images associated with entities such as ships, vehicles, and trains being within an area of interest. The general geo-fenced group of metadata may include entity identifiers, sentiment, activities, events, images, trends and topic specific micro-segmentation.

In step 508, geo-activity zone geo-fencing processor 110 (see FIG. 1) initiates a display of cross correlated and disambiguated geo-referenced metadata in representations of the four groups listed above in step 506.

Following step 508, the process of FIG. 5 ends at step 510.

Applying Supervised Learning to Geo-Activity Zone Cells

Figure 6:
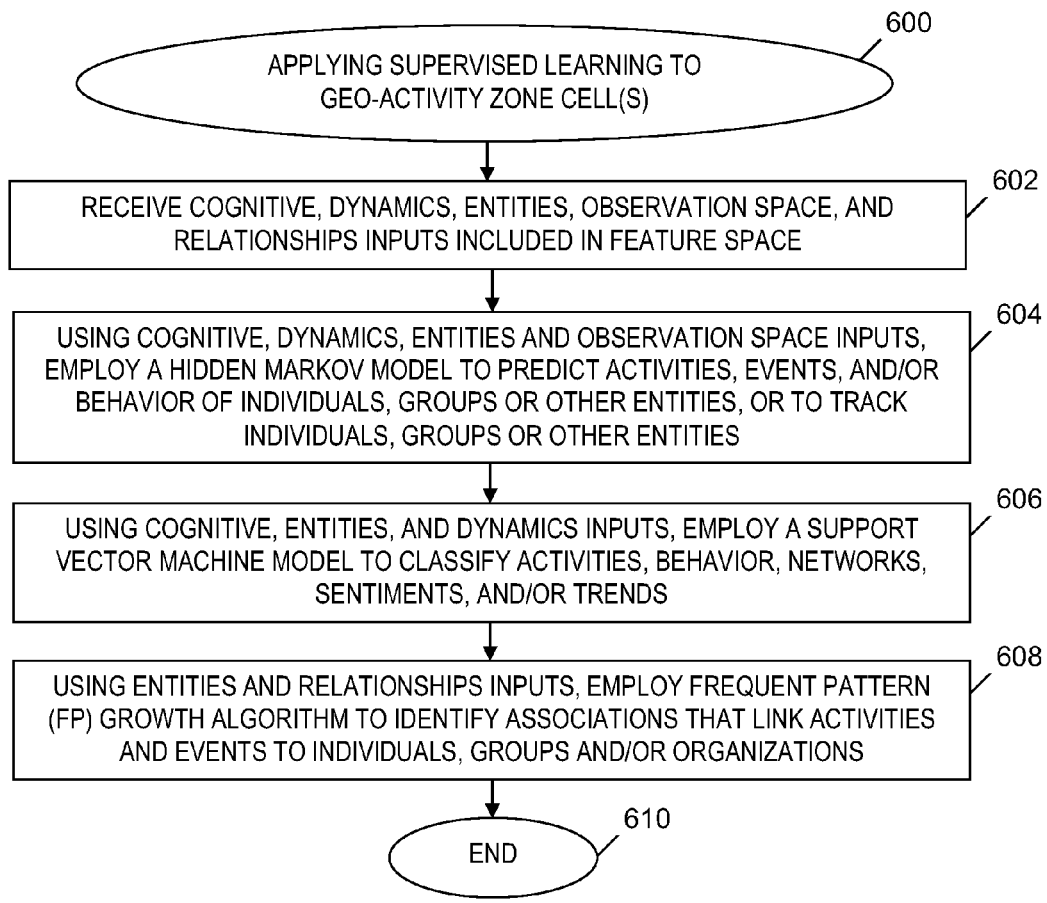
FIG. 6 depicts a flowchart of a process of applying supervised learning to geo-activity zone cell(s), where the process is included in the process of FIGS. 2A-2B, in accordance with embodiments of the present invention.

FIG. 6 depicts a flowchart of a process of applying supervised learning to geo-activity zone cell(s), where the process is included in the process of FIGS. 2A-2B, in accordance with embodiments of the present invention. In one embodiment, the process of FIG. 6 is included in step 224 (see FIG. 2B). The process of FIG. 6 starts at step 600. In step 602, multimodal analysis processor 112 (see FIG. 1)

receives cognitive, dynamics, entities, observation space, and relationships inputs included in a feature space.

In one embodiment, the cognitive input includes trends, concepts, sentiment, and behavior; the dynamics input includes events, activities, situations and visual cues; the relationships input includes links, networks, non-obvious relationships and biometrics; the entities input includes people, entities, profiles, locations, names, organizations, weapons, technology, slang, key words, and acronyms; and the observation space includes weather, economic, political, cultural and infrastructure observations.

In step 604, using the cognitive, dynamics, entities and observation space inputs received in step 602, multimodal analysis processor 112 (see FIG. 1) employs a hidden Markov model to predict activities, events and/or behavior of individuals, groups or other entities, or to track individuals, groups or other entities.

In step 606, using the cognitive, entities and dynamics inputs received in step 602, multimodal analysis processor 112 (see FIG. 1) employs a vector machine model to classify activities, behavior, networks (i.e., groups of persons), sentiments and/or trends.

In step 608, using the entities and relationships inputs received in step 602, multimodal analysis processor 112 (see FIG. 1) employs a frequent pattern (FP) growth algorithm to identify associations that link activities and events to individuals, groups and/or organizations.

The process of FIG. 6 ends at step 610.

In an alternate embodiment, applying supervised learning to geo-activity zone cells includes a subset of steps 604, 606 and 608. In an alternate embodiment, steps 604, 606 and 608 are performed in an order other than the order described above.

Applying Unsupervised Learning to Geo-Activity Zone Cells

Figure 7:
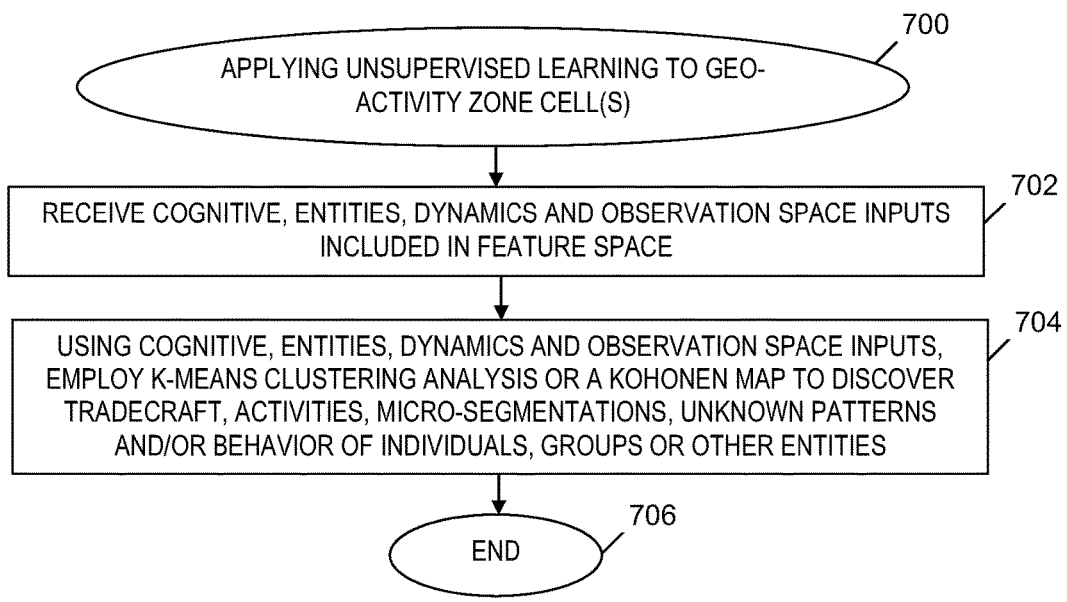
FIG. 7 depicts a flowchart of a process of applying unsupervised learning to geo-activity zone cell(s), where the process is included in the process of FIGS. 2A-2B, in accordance with embodiments of the present invention.

FIG. 7 depicts a flowchart of a process of applying unsupervised learning to geo-activity zone cell(s), where the process is included in the process of FIGS. 2A-2B, in accordance with embodiments of the present invention. In one embodiment, the process of FIG. 7 is included in step 226 (see FIG. 2B). The process of FIG. 7 starts at step 700. In step 702, multimodal analysis processor 112 (see FIG. 1) receives cognitive, dynamics, entities and observation space inputs included in a feature space.

In step 704, using the cognitive, dynamics, entities and observation space inputs received in step 702, multimodal analysis processor 112 (see FIG. 1) employs k-means clustering analysis or a Kohonen map to discover or determine tradecraft, activities, micro-segmentations, previously unknown patterns, and/or behavior of individuals, groups or other entities.

The process of FIG. 7 ends at step 706.

Computer System

Figure 8:
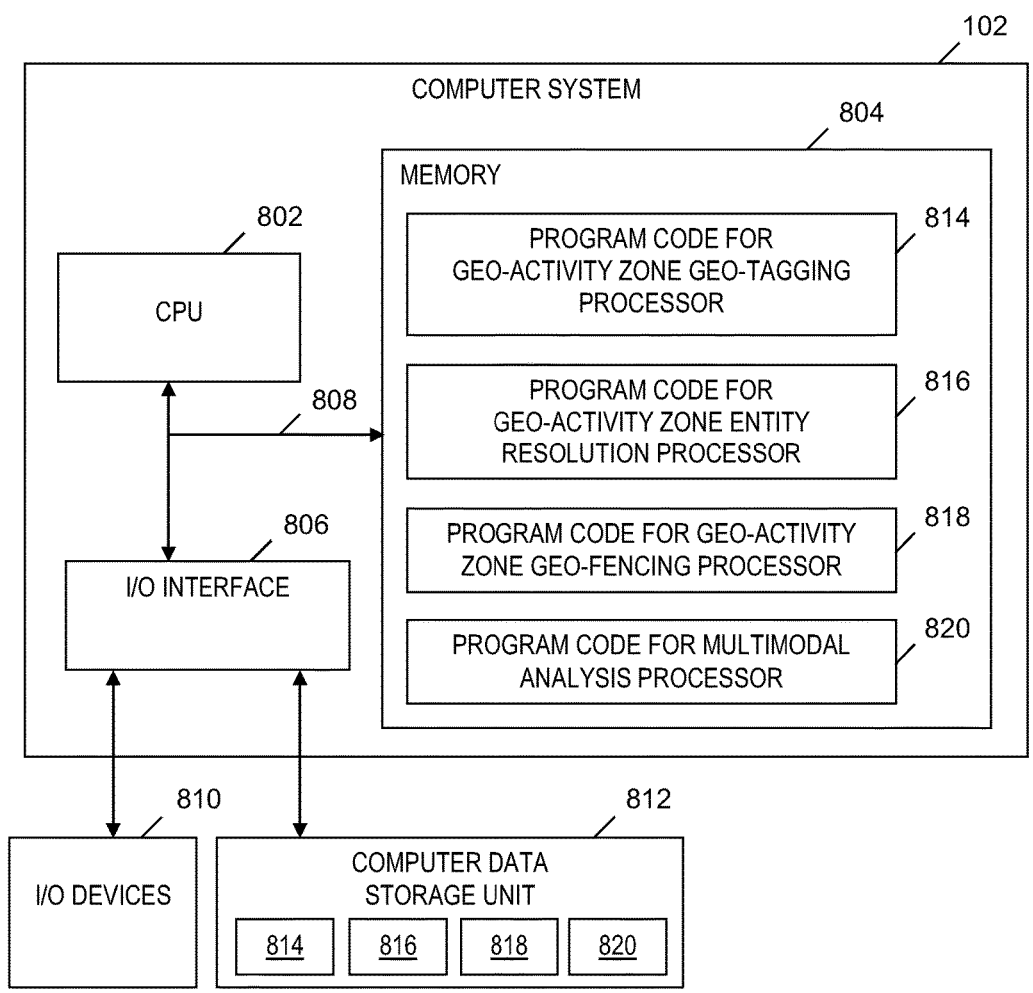
FIG. 8 is a block diagram of a computer system included in the system of FIG. 1 and that implements the process of FIGS. 2A-2B, in accordance with embodiments of the present invention.

FIG. 8 is a block diagram of a computer system included in the system of FIG. 1 and that implements the process of FIGS. 2A-2B, in accordance with embodiments of the present invention. Computer system 102 generally includes a central processing unit (CPU) 802, a memory 804, an input/output (I/O) interface 806, and a bus 808. Further, computer system 102 is coupled to I/O devices 810 and a computer data storage unit 812. CPU 802 performs computation and control functions of computer system 102, including executing instructions included in program code 814, 816, 818 and 820 to perform a method of filtering data into a geo-activity zone cell, where the instructions are executed by CPU 802 via memory 804. CPU 802 may include a single processing unit, or be distributed across one or more processing units in one or more locations (e.g., on a client and server). Program code 814 includes program code for geo-activity zone geo-tagging processor 106 (see FIG. 1). Program code 816 includes program code for geo-activity zone entity resolution processor 108 (see FIG. 1). Program code 818 includes program code for geo-activity zone geo-fencing processor 110 (see FIG. 1). Program code 820 includes program code for multimodal analysis processor 112 (see FIG. 1). In one embodiment, program code 814, 816, 818 and 820 are included in program code for activity based analytics engine 104 (see FIG. 1).

Memory 804 includes a known computer-readable storage medium, which is described below. In one embodiment, cache memory elements of memory 804 provide temporary storage of at least some program code (e.g., program code 814, 816, 818 and 820) in order to reduce the number of times code must be retrieved from bulk storage while instructions of the program code are executed. Moreover, similar to CPU 802, memory 804 may reside at a single physical location, including one or more types of data storage, or be distributed across a plurality of physical systems in various forms. Further, memory 804 can include data distributed across, for example, a local area network (LAN) or a wide area network (WAN).

I/O interface 806 includes any system for exchanging information to or from an external source. I/O devices 810 include any known type of external device, including a display device (e.g., monitor), keyboard, mouse, printer, speakers, handheld device, facsimile, etc. Bus 808 provides a communication link between each of the components in computer system 102, and may include any type of transmission link, including electrical, optical, wireless, etc.

I/O interface 806 also allows computer system 102 to store information (e.g., data or program instructions such as program code 814, 816, 818 and 820) on and retrieve the information from computer data storage unit 812 or another computer data storage unit (not shown). In one embodiment, program code 814, 816, 818 and 820 are stored on computer data storage unit 812. Computer data storage unit 812 includes a known computer-readable storage medium, which is described below. In one embodiment, computer data storage unit 812 is a non-volatile data storage device, such as a magnetic disk drive (i.e., hard disk drive) or an optical disc drive (e.g., a CD-ROM drive which receives a CD-ROM disk).

Memory 804 and/or storage unit 812 may store computer program code 814, 816, 818 and 820 that includes instructions that are executed by CPU 802 via memory 804 to filter data into a geo-activity zone cell. Although FIG. 8 depicts memory 804 as including program code 814, 816, 818 and 820, the present invention contemplates embodiments in which memory 804 does not include all of code 814, 816, 818 and 820 simultaneously, but instead at one time includes only a portion of code 814, a portion of code 816, a portion of code 818 and/or a portion of code 820.

Further, memory 804 may include other systems not shown in FIG. 8, such as an operating system (e.g., Linux®) that runs on CPU 802 and provides control of various components within and/or connected to computer system 102. Linux is a registered trademark of Linus Torvalds in the United States, other countries, or both.

Storage unit 812 and/or one or more other computer data storage units (not shown) that are coupled to computer system 102 may store ontology map 124 (see FIG. 1), area(s) of interest 114 (see FIG. 1) and/or geospatial, temporal and contextual metadata boundaries 116 (see FIG. 1).

As will be appreciated by one skilled in the art, in a first embodiment, the present invention may be a system; in a second embodiment, the present invention may be a method; and in a third embodiment, the present invention may be a computer program product. A component of an embodiment of the present invention may take the form of an entirely hardware-based component, an entirely software component (including firmware, resident software, micro-code, etc.) or a component combining software and hardware sub-components that may all generally be referred to herein as a "module".

An embodiment of the present invention may take the form of a computer program product embodied in one or more computer-readable medium(s) (e.g., memory 804 and/or computer data storage unit 812) having computer-readable program code (e.g., program code 814, 816, 818 and 820) embodied or stored on the computer-readable storage medium(s).

Any combination of one or more computer-readable mediums (e.g., memory 804 and computer data storage unit 812) may be utilized. In one embodiment, the computer-readable medium is a computer-readable storage medium, and in another embodiment, the computer-readable medium is a computer-readable signal medium. As used herein, a computer-readable storage medium is not a computer-readable signal medium.

In one embodiment, the computer-readable storage medium is a physical, tangible computer-readable storage device or physical, tangible computer-readable storage apparatus that stores but is not a propagation medium, and is not a transitory form of signal transmission. A computer-readable storage medium may include, for example, an electronic, magnetic, optical, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium is a physical, tangible storage medium that can contain or store a program (e.g., program 814, 816, 818 and 820) for use by or in connection with a system, apparatus, or device for carrying out instructions in the program, and which does not propagate.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 814, 816, 818 and 820) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 814, 816, 818 and 820) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 8. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2B, FIG. 3, FIG. 5, FIG. 6 and FIG. 7) and/or block diagrams of methods, apparatus (systems) (e.g., FIG. 1 and FIG. 8), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 814, 816, 818 and 820). These computer program instructions may be provided to one or more hardware processors (e.g., CPU 802) of a general purpose computer, special purpose computer, or other programmable data processing apparatus to produce a machine, such that the instructions, which are executed via the processor(s) of the computer or other programmable data processing apparatus, create means for implementing the functions/acts specified in the flowcharts and/or block diagram block or blocks.

These computer program instructions may also be stored in a computer-readable medium (e.g., memory 804 or computer data storage unit 812) that can direct a computer (e.g., computer system 102), other programmable data processing apparatus, or other devices to function in a particular manner, such that the instructions (e.g., program 814, 816, 818 and 820) stored in the computer-readable medium produce an article of manufacture including instructions which implement the function/act specified in the flowcharts and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer-implemented process such that the instructions (e.g., program 814, 816, 818 and 820) which are executed on the computer, other programmable apparatus, or other devices provide processes for implementing the functions/acts specified in the flowcharts and/or block diagram block or blocks.

Any of the components of an embodiment of the present invention can be deployed, managed, serviced, etc. by a service provider that offers to deploy or integrate computing infrastructure with respect to filtering data into a geo-activity zone cell. Thus, an embodiment of the present invention discloses a process for supporting computer infrastructure, where the process includes providing at least one support service for at least one of integrating, hosting, maintaining and deploying computer-readable code (e.g., program code 814, 816, 818 and 820) in a computer system (e.g., computer system 102) including one or more processors (e.g., CPU 802), wherein the processor(s) carry out instructions contained in the code causing the computer system to filter data into a geo-activity zone cell. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of filtering data into a geo-activity zone cell.

While it is understood that program code 814, 816, 818 and 820 for filtering data into a geo-activity zone cell may be deployed by manually loading directly in client, server and proxy computers via loading a computer-readable storage medium (e.g., computer data storage unit 812), program code 814, 816, 818 and 820 may also be automatically or semi-automatically deployed into computer system 102 by sending program code 814, 816, 818 and 820 to a central server computer or a group of central servers. Program code 814, 816, 818 and 820 is then downloaded into computer system 102, which will execute program code 814, 816, 818 and 820. Alternatively, program code 814, 816, 818 and 820 is sent directly to the computer system 102 via e-mail. Program code 814, 816, 818 and 820 is then either detached to a directory on computer system 102 or loaded into a directory on computer system 102 by a button on the e-mail that executes a program that detaches program code 814, 816, 818 and 820 into a directory. Another alternative is to send program code 814, 816, 818 and 820 directly to a directory on a hard drive of computer system 102. In a case in which there are proxy servers, the process selects the proxy server code, determines on which computers to place the proxy servers' code, transmits the proxy server code, and then installs the proxy server code on the proxy computer. Program code 814, 816, 818 and 820 is transmitted to the proxy server (i.e., computer system 102) and then it is stored on the proxy server.

In one embodiment, program code 814, 816, 818 and 820 is integrated into a client, server and network environment by providing for program code 814, 816, 818 and 820 to coexist with software applications (not shown), operating systems (not shown) and network operating systems software (not shown) and then installing program code 814, 816, 818 and 820 on the clients and servers (e.g., computer system 102) in the environment where program code 814, 816, 818 and 820 will function.

The first step of the aforementioned integration of code included in program code 814, 816, 818 and 820 is to identify any software on the clients and servers including the network operating system (not shown) where program code 814, 816, 818 and 820 will be deployed that are required by program code 814, 816, 818 and 820 or that work in conjunction with program code 814, 816, 818 and 820. This identified software includes the network operating system that is software that enhances a basic operating system by adding networking features. Next, the software applications and version numbers are identified and compared to the list of software applications and version numbers that have been tested to work with program code 814, 816, 818 and 820. Those software applications that are missing or that do not match the correct version are upgraded with the correct version numbers. Program instructions that pass parameters from program code 814, 816, 818 and 820 to the software applications are checked to ensure the parameter lists match the parameter lists required by the program code 814, 816, 818 and 820. Conversely, parameters passed by the software applications to program code 814, 816, 818 and 820 are checked to ensure the parameters match the parameters required by program code 814, 816, 818 and 820. The client and server operating systems including the network operating systems are identified and compared to the list of operating systems, version numbers and network software that have been tested to work with program code 814, 816, 818 and 820. Those operating systems, version numbers and network software that do not match the list of tested operating systems and version numbers are upgraded on the clients and servers to the required level. After ensuring that the software, where program code 814, 816, 818 and 820 is to be deployed, is at the correct version level that has been tested to work with program code 814, 816, 818 and 820, the integration is completed by installing program code 814, 816, 818 and 820 on the clients and servers.

Another embodiment of the invention provides a method that performs the process steps on a subscription, advertising and/or fee basis. That is, a service provider, such as a Solution Integrator, can offer to create, maintain, support, etc. a process of filtering data into a geo-activity zone cell. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The flowcharts in FIGS. 2A-2B, FIG. 3, FIG. 5, FIG. 6 and FIG. 7 and the block diagrams in FIG. 1 and FIG. 8 illustrate the architecture, functionality, and operation of possible implementations of systems, methods, and computer program products according to various embodiments of the present invention. In this regard, each block in the flowcharts or block diagrams may represent a module, segment, or portion of code (e.g., program code 814, 816, 818 or 820), which includes one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of filtering data, the method comprising the steps of:
   a computer determining whether a first geo-hash has more characters than a second geo-hash, the first geo-hash being converted from first location information about a person who is specified by a first area of interest, the first location information extracted from first profile data that describes the person and being a first value of a first geospatial tag, and the second geo-hash being converted from second location information about the person, the second location information inferred by employing a model which is trained by historical data and which uses a k-nearest neighbor distance calculator, and the second location information being a second value of the first geospatial tag;

if the first geo-hash has more characters than the second geo-hash, the computer selecting the first geo-hash as an optimal geo-hash that specifies the first geospatial tag or if the second geo-hash has more characters than the first geo-hash, the computer selecting the second geo-hash as the optimal geo-hash that specifies the first geospatial tag;

based in part on the optimal geo-hash determined by whether the first or second geo-hash has more characters, the computer determining a first correlation between (1) the first geospatial tag and a second geospatial tag and (2) a third geospatial tag, wherein the second geospatial tag along with a first time and date stamp, and first contextual information specifying an activity is included in a first portion of a first group of metadata obtained from data extracted from streaming data and from data at rest, the activity being included in a domain of knowledge associated with law enforcement, and wherein the third geospatial tag is included in a second group of metadata obtained from the data extracted from the streaming data and from the data at rest;

the computer determining a second correlation between (1) the first time and date stamp and a second time and data stamp and (2) a third time and date stamp, wherein the second time and date stamp is included in a second portion of the first group of metadata, and wherein the third time and date stamp is included in the second group of metadata;

the computer determining a third correlation between (1) first and second contextual information and (2) third contextual information, wherein the first contextual information is included in the first portion of the first group of metadata, the second contextual information is included in the second portion of the first group of metadata, and the third contextual information is included in the second group of metadata;

based on the first, second, and third correlations, the computer determining a relationship between a first entity-metadata element specifying the person and a second entity-metadata element specifying a vehicle specified by a second area of interest, and between the person and the vehicle;

based on (1) the relationship between the first and second entity-metadata elements and between the person and the vehicle, and (2) the first, second, and third geospatial tags, the computer displaying representations of the first and second entity-metadata elements within a regular polygon that includes locations indicated by the first, second, and third geospatial tags;

the computer employing a hidden Markov model, which tracks the person and the vehicle;

the computer employing a support vector machine model, which classifies the activity;

the computer employing a frequent pattern growth algorithm, which identifies associations between the activity and one or more other persons;

the computer employing a Kohonen map, which determines a previously unknown activity of the person and the vehicle; and based on the hidden Markov model, the support vector machine model, the frequent pattern growth algorithm, and the Kohonen map, the computer predicting another activity of the person.

2. The method of claim 1, further comprising the steps of:
subsequent to the step of displaying the representations of the first and second entity-metadata elements, the computer extracting additional data from the streaming data and from the data at rest;

based on the additional extracted data, the computer determining a third entity-metadata element specifying a person of interest, a network of persons, or another vehicle, the third entity-metadata element including a geo-spatial tag that indicates a location within a zone specified by geographic coordinates of a center point and a distance from the center point, the regular polygon being based on the geographic coordinates of the center point and the distance from the center point;

based on the geo-spatial tag included in the third entity-metadata element, the computer generating and displaying a representation of the third entity-metadata element within the regular polygon, which includes the representations of the first and second entity-metadata elements; and the computer tracking changes to the zone which includes an addition of the third entity-metadata element to the zone.

3. The method of claim 2, wherein the step of determining the third entity-metadata element includes:
performing a continuous query against the extracted additional data using a master key to search for metadata that is geo-referenced based on the center point and the distance from the center point;

based on the master key, cross correlating and disambiguating the metadata that is geo-referenced into a set of groups including at least a first group associated with a person of interest, a second group associated with a network of persons, and a third group associated with another vehicle; and designating the third entity-metadata element as including a portion of the metadata included in the first, second, or third group in the set of groups.

4. The method of claim 2, further comprising the steps of:
the computer selecting another person, another vehicle, or a network of persons;

the computer extracting other data from the streaming data and from the data at rest;

the computer determining other metadata of the extracted other data;

the computer filtering the extracted other data into another entity-metadata element in another zone based on the other metadata being within metadata boundaries of the other entity-metadata element;

the computer employing complex entity correlation which determines a relationship between the zone and the other zone based on a relationship between the first entity-metadata element and the other entity-metadata element; and the computer generating and sending an alert about the zone and the other zone being related.

5. The method of claim 1, further comprising the step of:
providing at least one support service for at least one of creating, integrating, hosting, maintaining, and deploying computer-readable program code in the computer, the program code being executed by a processor of the computer to implement the steps of determining whether the first geo-hash has more characters as the second geo-hash, selecting the first geo-hash as the optimal geo-hash if the first geo-hash has more characters than the second geo-hash or selecting the second geo-hash as the optimal geo-hash if the second geo-hash has more characters than the first geo-hash, determining the first correlation, determining the second correlation, determining the third correlation, determining the relationship between the first and second entity-metadata elements and between the person and the vehicle, displaying the representations of the first and second entity-metadata elements, employing the hidden Markov model, employing the support vector machine model, employing the frequent pattern growth algorithm, employing the Kohonen map, and predicting the other activity of the person.

6. A computer system comprising:
   a central processing unit (CPU);
   a memory coupled to the CPU;
   a computer-readable, tangible storage device coupled to the CPU, the storage device containing instructions that are executed by the CPU via the memory to implement a method of filtering data, the method comprising the steps of:
     the computer system determining whether a first geo-hash has more characters than a second geo-hash, the first geo-hash being converted from first location information about a person who is specified by a first area of interest, the first location information extracted from first profile data that describes the person and being a first value of a first geospatial tag, and the second geo-hash being converted from second location information about the person, the second location information inferred by employing a model which is trained by historical data and which uses a k-nearest neighbor distance calculator, and the second location information being a second value of the first geospatial tag;
     if the first geo-hash has more characters than the second geo-hash, the computer system selecting the first geo-hash as an optimal geo-hash that specifies the first geospatial tag or if the second geo-hash has more characters than the first geo-hash, the computer system selecting the second geo-hash as the optimal geo-hash that specifies the first geospatial tag;
     based in part on the optimal geo-hash determined by whether the first or second geo-hash has more characters, the computer system determining a first correlation between (1) the first geospatial tag and a second geospatial tag and (2) a third geospatial tag, wherein the second geospatial tag along with a first time and date stamp, and first contextual information specifying an activity is included in a first portion of a first group of metadata obtained from data extracted from streaming data and from data at rest, the activity being included in a domain of knowledge associated with law enforcement, and wherein the third geospatial tag is included in a second group of metadata obtained from the data extracted from the streaming data and from the data at rest;
     the computer system determining a second correlation between (1) the first time and date stamp and a second time and data stamp and (2) a third time and date stamp, wherein the second time and date stamp is included in a second portion of the first group of metadata, and wherein the third time and date stamp is included in the second group of metadata;
     the computer system determining a third correlation between (1) first and second contextual information and (2) third contextual information, wherein the first contextual information is included in the first portion of the first group of metadata, the second contextual information is included in the second portion of the first group of metadata, and the third contextual information is included in the second group of metadata;
     based on the first, second, and third correlations, the computer system determining a relationship between a first entity-metadata element specifying the person and a second entity-metadata element specifying a vehicle specified by a second area of interest, and between the person and the vehicle;
     based on (1) the relationship between the first and second entity-metadata elements and between the person and the vehicle, and (2) the first, second, and third geospatial tags, the computer system displaying representations of the first and second entity-metadata elements within a regular polygon that includes locations indicated by the first, second, and third geospatial tags;
     the computer system employing a hidden Markov model, which tracks the person and the vehicle;
     the computer system employing a support vector machine model, which classifies the activity;
     the computer system employing a frequent pattern growth algorithm, which identifies associations between the activity and one or more other persons;
     the computer system employing a Kohonen map, which determines a previously unknown activity of the person and the vehicle; and
     based on the hidden Markov model, the support vector machine model, the frequent pattern growth algorithm, and the Kohonen map, the computer system predicting another activity of the person.

7. The computer system of claim 6, wherein the method further comprises the steps of:
   subsequent to the step of displaying the representations of the first and second entity-metadata elements, the computer system extracting additional data from the streaming data and from the data at rest;
   based on the additional extracted data, the computer system determining a third entity-metadata element specifying a person of interest, a network of persons, or another vehicle, the third entity-metadata element including a geo-spatial tag that indicates a location within a zone specified by geographic coordinates of a center point and a distance from the center point, the regular polygon being based on the geographic coordinates of the center point and the distance from the center point;
   based on the geo-spatial tag included in the third entity-metadata element, the computer system generating and displaying a representation of the third entity-metadata element within the regular polygon, which includes the representations of the first and second entity-metadata elements; and
   the computer system tracking changes to the zone which includes an addition of the third entity-metadata element to the zone.

8. The computer system of claim 7, wherein the step of determining the third entity-metadata element includes:

performing a continuous query against the extracted additional data using a master key to search for metadata that is geo-referenced based on the center point and the distance from the center point;
based on the master key, cross correlating and disambiguating the metadata that is geo-referenced into a set of groups including at least a first group associated with a person of interest, a second group associated with a network of persons, and a third group associated with another vehicle; and
designating the third entity-metadata element as including a portion of the metadata included in the first, second, or third group in the set of groups.

9. The computer system of claim 7, wherein the method further comprises the steps of:
the computer system selecting another person, another vehicle, or a network of persons;
the computer system extracting other data from the streaming data and from the data at rest;
the computer system determining other metadata of the extracted other data;
the computer system filtering the extracted other data into another entity-metadata element in another zone based on the other metadata being within metadata boundaries of the other entity-metadata element;
the computer system employing complex entity correlation which determines a relationship between the zone and the other zone based on a relationship between the first entity-metadata element and the other entity-metadata element; and
the computer system generating and sending an alert about the zone and the other zone being related.

10. A computer program product, comprising:
a computer-readable, tangible storage device; and
a computer-readable program code stored in the computer-readable, tangible storage device, the computer-readable program code containing instructions that are executed by a central processing unit (CPU) of a computer system to implement a method of filtering data, the method comprising the steps of:
the computer system determining whether a first geo-hash has more characters than a second geo-hash, the first geo-hash being converted from first location information about a person who is specified by a first area of interest, the first location information extracted from first profile data that describes the person and being a first value of a first geospatial tag, and the second geo-hash being converted from second location information about the person, the second location information inferred by employing a model which is trained by historical data and which uses a k-nearest neighbor distance calculator, and the second location information being a second value of the first geospatial tag;
if the first geo-hash has more characters than the second geo-hash, the computer system selecting the first geo-hash as an optimal geo-hash that specifies the first geospatial tag or if the second geo-hash has more characters than the first geo-hash, the computer system selecting the second geo-hash as the optimal geo-hash that specifies the first geospatial tag;
based in part on the optimal geo-hash determined by whether the first or second geo-hash has more characters, the computer system determining a first correlation between (1) the first geospatial tag and a second geospatial tag and (2) a third geospatial tag, wherein the second geospatial tag along with a first time and date stamp, and first contextual information specifying an activity is included in a first portion of a first group of metadata obtained from data extracted from streaming data and from data at rest, the activity being included in a domain of knowledge associated with law enforcement, and wherein the third geospatial tag is included in a second group of metadata obtained from the data extracted from the streaming data and from the data at rest;
the computer system determining a second correlation between (1) the first time and date stamp and a second time and data stamp and (2) a third time and date stamp, wherein the second time and date stamp is included in a second portion of the first group of metadata, and wherein the third time and date stamp is included in the second group of metadata;
the computer system determining a third correlation between (1) first and second contextual information and (2) third contextual information, wherein the first contextual information is included in the first portion of the first group of metadata, the second contextual information is included in the second portion of the first group of metadata, and the third contextual information is included in the second group of metadata;
based on the first, second, and third correlations, the computer system determining a relationship between a first entity-metadata element specifying the person and a second entity-metadata element specifying a vehicle specified by a second area of interest, and between the person and the vehicle;
based on (1) the relationship between the first and second entity-metadata elements and between the person and the vehicle, and (2) the first, second, and third geospatial tags, the computer system displaying representations of the first and second entity-metadata elements within a regular polygon that includes locations indicated by the first, second, and third geospatial tags;
the computer system employing a hidden Markov model, which tracks the person and the vehicle;
the computer system employing a support vector machine model, which classifies the activity;
the computer system employing a frequent pattern growth algorithm, which identifies associations between the activity and one or more other persons;
the computer system employing a Kohonen map, which determines a previously unknown activity of the person and the vehicle; and
based on the hidden Markov model, the support vector machine model, the frequent pattern growth algorithm, and the Kohonen map, the computer system predicting another activity of the person.

11. The program product of claim 10, wherein the method further comprises the steps of:
subsequent to the step of displaying the representations of the first and second entity-metadata elements, the computer system extracting additional data from the streaming data and from the data at rest;
based on the additional extracted data, the computer system determining a third entity-metadata element specifying a person of interest, a network of persons, or another vehicle, the third entity-metadata element including a geo-spatial tag that indicates a location within a zone specified by geographic coordinates of a center point and a distance from the center point, the regular polygon being based on the geographic coordinates of the center point and the distance from the center point;

based on the geo-spatial tag included in the third entity-metadata element, the computer system generating and displaying a representation of the third entity-metadata element within the regular polygon, which includes the representations of the first and second entity-metadata elements; and the computer system tracking changes to the zone which includes an addition of the third entity-metadata element to the zone.

12. The program product of claim 11, wherein the step of determining the third entity-metadata element includes:

performing a continuous query against the extracted additional data using a master key to search for metadata that is geo-referenced based on the center point and the distance from the center point;

based on the master key, cross correlating and disambiguating the metadata that is geo-referenced into a set of groups including at least a first group associated with a person of interest, a second group associated with a network of persons, and a third group associated with another vehicle; and designating the third entity-metadata element as including a portion of the metadata included in the first, second, or third group in the set of groups.

13. The program product of claim 11, wherein the method further comprises the steps of:

the computer system selecting another person, another vehicle, or a network of persons;

the computer system extracting other data from the streaming data and from the data at rest;

the computer system determining other metadata of the extracted other data;

the computer system filtering the extracted other data into another entity-metadata element in another zone based on the other metadata being within metadata boundaries of the other entity-metadata element;

the computer system employing complex entity correlation which determines a relationship between the zone and the other zone based on a relationship between the first entity-metadata element and the other entity-metadata element; and the computer system generating and sending an alert about the zone and the other zone being related.

* * * * *